United States Patent [19]
Tlustoš

[11] Patent Number: 6,099,151
[45] Date of Patent: Aug. 8, 2000

[54] LIGHTING SYSTEM AT REAR PART OF MOTORCYCLES

[76] Inventor: Martin Tlustoš, Moravská 10, CZ-120 00 Praha 2, Czech Rep.

[21] Appl. No.: 09/096,799

[22] Filed: Jun. 12, 1998

[30] Foreign Application Priority Data

Jun. 18, 1997 [CZ] Czech Rep. .............................. 6852-97

[51] Int. Cl.[7] ...................................................... B62J 6/04
[52] U.S. Cl. ............................................. 362/473; 362/541
[58] Field of Search ...................................... 362/473, 474, 362/475, 476, 496, 506, 540, 541, 545, 800, 499; 340/432, 479

[56] References Cited

U.S. PATENT DOCUMENTS 4,204,191 5/1980 Daniels .
4,277,819 7/1981 Sobota et al. ............................ 362/800
5,558,427 9/1996 Yang ........................................ 362/503

FOREIGN PATENT DOCUMENTS 2 265 588 10/1993 United Kingdom .

Primary Examiner—Y. Quach
Attorney, Agent, or Firm—Barnes & Thornburg

[57] ABSTRACT

A lighting system at a rear part (3) of a motorcycle having at least one of a rear clearance light, a main brake light and a numberplate light contained in a vertical central plane of a rear wheel, and rear direction lights situated symmetrically to the central vertical plane. Additional brake lights (8.1 and 8.2) are electrically connected with the main brake light (5) and arranged generally symmetrically to the central vertical plane of the rear wheel (6) at the rear part (3) of the motorcycle (1).

8 Claims, 2 Drawing Sheets

LIGHTING SYSTEM AT REAR PART OF MOTORCYCLES

TECHNICAL AREA

Technical solution concerns lighting system at rear part of motorcycle, which contains in vertical central plane of rear wheel arranged rear clearance light and brake light, or possibly also lighting of numberplate, as well as rear direction lights.

STATE OF THE ART

Driver of motorcycle is obliged in accordance with the currently valid regulations to have the lighting switched on even when visibility is good; the lighting comprises front main dimmed light and rear clearance light. Current motorcycles, including small bikes are designed in such a way that these lights are switched on automatically after start of the motor.

Rear clearance light is for practical reasons coupled in grouped lighting together with rear brake light or possibly with lighting of numberplate. This means that during normal ride of the motorcycle the rear clearance light is lighted, and in its light the brake light can be overlooked, especially in full daylight, in spite of the fact that brake light usually differs from rear clearance light by its size, partially by color and particularly by its intensity. Practical consequence of this arrangement is that driver following the motorcycle can hardly discern these two similar lights placed next to each other, especially if he misses the moment of lighting-up of the more intense brake light.

It is therefore necessary to discern markedly the brake light. This development has already taken its course, although in some countries unofficially, in case of passenger cars, which are currently equipped with the 'third' braking light, which is usually placed in longitudinal axis of the vehicle behind its rear windscreen, so that when the car brakes, the three braking lights form vertices of an isosceles triangle.

This solution has proved itself at extensive tests, particularly in city traffic, and as a result this third brake light is in number of states already required by national regulations and in other states its use is allowed.

Discriminability of brake light has so far not been satisfactorily resolved for motorcycles, although these vehicles are the most vulnerable in traffic, especially in case of impact from the back.

Target of this technical solution is therefore finding of new arrangement of lighting system at rear part of motorcycle, which would enable better discrimination of brake light from rear clearance light.

PRINCIPLE OF TECHNICAL SOLUTION

This is task resolved and disadvantages of so far known solutions of this kind by the proposed technical solution of the lighting system at rear side of motorcycle, comprising rear clearance light and brake light, possibly also with lighting of numberplate arranged in vertical central plane of the rear wheel, together with direction lights arranged symmetrically to this central vertical, which consists in the fact that additional brake lights are placed at the rear part of motorcycle practically symmetrically to this central vertical of the rear wheel; this additional brake light is electrically connected with main brake light.

It is advantageous for practical reasons, particularly from the viewpoint of manufacturing and assembly costs, to arrange these additional brake lights at the rear part of motorcycle next to rear direction lights.

It is moreover beneficial, from the viewpoint of unequivocal optical perception, if the additional brake lights at the rear part of motorcycle are situated at vertices of an isosceles triangle with the main vertex represented by the main brake light.

In some practical cases it can be also advantageous if additional brake lights are arranged at the rear part of motorcycle on the trunk box.

Lighting system at rear side of motorcycle arranged in accordance with this technical solutions brings an advantage consisting in substantially more distinct signaling of braking for the drivers in vehicles following the motorcycle, which consequently increases safety of road traffic.

BRIEF DESCRIPTION OF THE DRAWING(S)

Principle of technical solution is moreover explained on nonrestrictive example of its execution, which is described in the enclosed figures, representing:

In FIG. 1 schematic rear view of a motorcycle, showing conventional arrangement of lighting system at the rear part of the motorcycle, when direction and brake lights are not lit;

In FIG. 2 schematic rear view of a motorcycle, showing conventional arrangement of lighting system at the rear part of the motorcycle, when direction lights are not lit while brake light is lit;

In FIG. 3 schematic rear view of a motorcycle, showing arrangement of lighting system at the rear part of the motorcycle in accordance with this technical solution, when direction lights, brake lights and additional brake lights are not lit;

In FIG. 4 schematic rear view of a motorcycle, showing arrangement of lighting system at the rear part of the motorcycle in accordance with this technical solution, when direction lights are not lit, while brake lights and additional brake lights are lit;

DETAILED DESCRIPTION OF THE INVENTION

Figure 1:
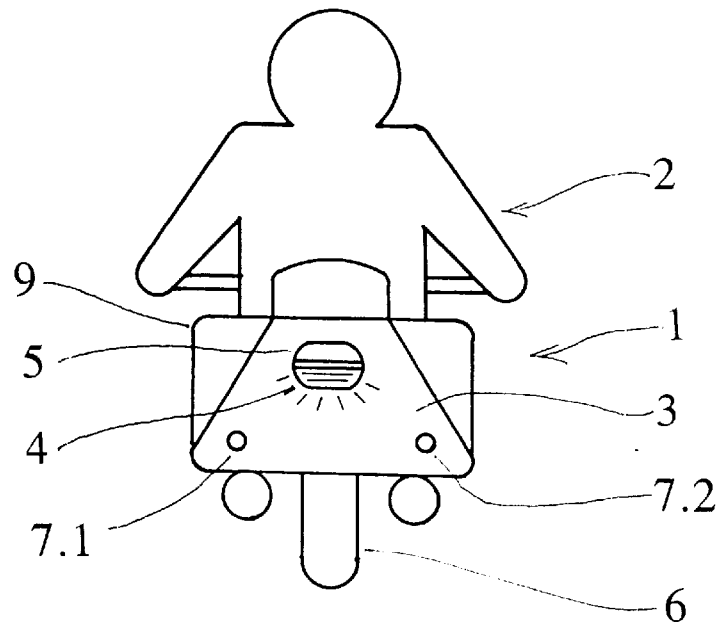

FIG. 1 demonstrates schematic rear view of a motorcycle 1 with the rider 2, from which the conventional arrangement of lighting system at the rear part of the motorcycle 1 is evident; it shows the situation when motor is running, regardless to the fact whether the motorcycle runs or stands and regardless to visibility conditions. No rear direction light 7.1 or 7.2 is lit, rear clearance light 4 situated in the central plane of rear wheel 6 is lit, and brake light 5 usually coupled with it is not lit. Lighting of the numberplate (not shown in this Figure), which is usually coupled with rear clearance light 4 and brake light 5 in joint group lighting, is lit as well.

Figure 2:
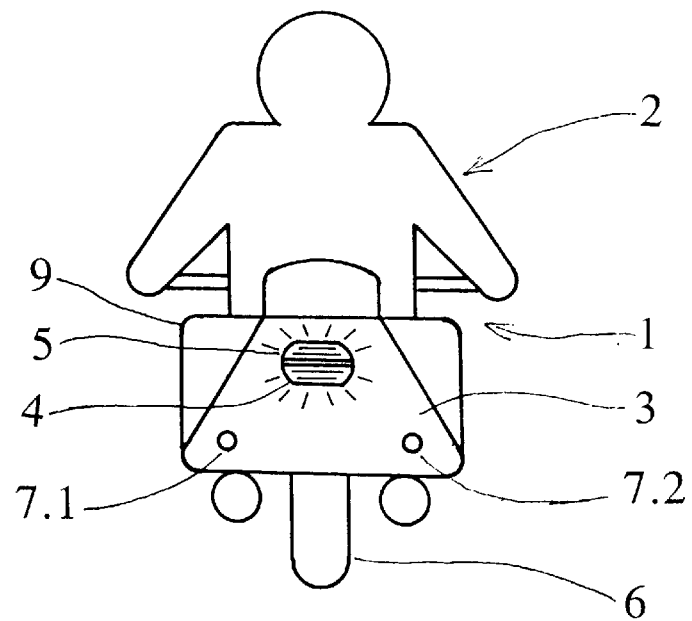

FIG. 2 gives schematic rear view of a motorcycle 1 with the rider 2 corresponding to the FIG. 1 with the difference that motorcycle 1 is right now braking, so in contrast to FIG. 1 the brake light 5 is lit as well. It is evident that this practically only increases intensity of light of the joint group lighting of practically same color, which can easily escape attention of the driver of the vehicle following the motorcycle, namely at full sunlight.

Figure 3:
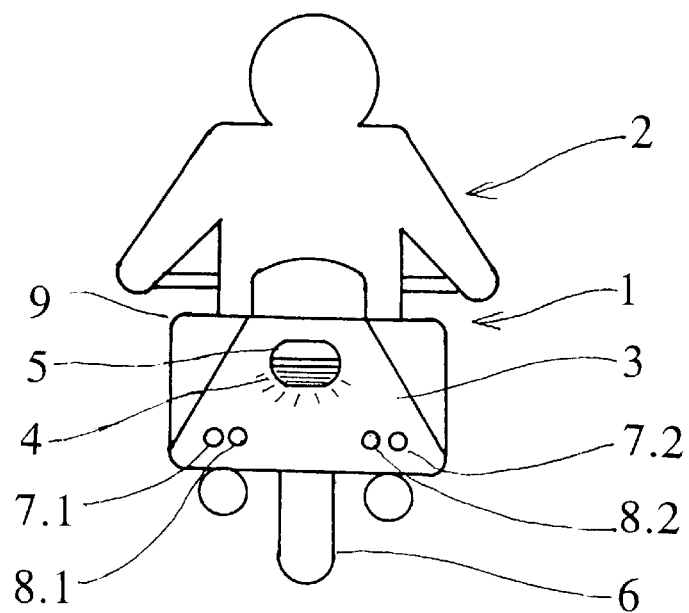

Lighting system at rear side 3 of the motorcycle 1 in accordance with this technical solution is shown in the FIG. 3. Schematic rear view of a motorcycle 1 demonstrates arrangement of lighting system at rear side 3 of the motorcycle 1; in this case a pairs of additional brake lights 8.1 and 8.2 is added to the already described lights 4, 5, 7.1 and 7.2. In this situation the additional brake lights 8.1 and 8.2 as well as the brake light 5 are not lit. It is evident that additional brake lights 8.1 and 8.2 are arranged at the rear part 3 in bottom vertices of the isosceles triangle with its main vertex in the place of the main brake light 5. It is generally advantageous, although not necessary, if these additional brake lights 8.1 and 8.2 are arranged next to the rear direction lights 7.1 and 7.2, or if they are coupled with these rear direction lights 7.1 and 7.2.

It is, though, also possible that these additional brake lights 8.1 and 8.2 are arranged in horizontal plane of the rear brake light 5, or possibly in top vertices of the isosceles triangle with its main vertex in the place of the main brake light 5.

Similarly it is not necessary that these additional brake lights 8.1 and 8.2 are arranged at the structure of the rear part 3, since subject to design of the motorcycle 1 it could be advantageous to arrange these additional brake lights 8.1 and 8.2 at the rear part 3 for example on the trunk box 9 and likewise. The only principle that should be preserved for practical and esthetic reasons is symmetrical arrangement of these additional brake lights 8.1 and 8.2 in respect to the central vertical of the rear wheel 6.

Figure 4:
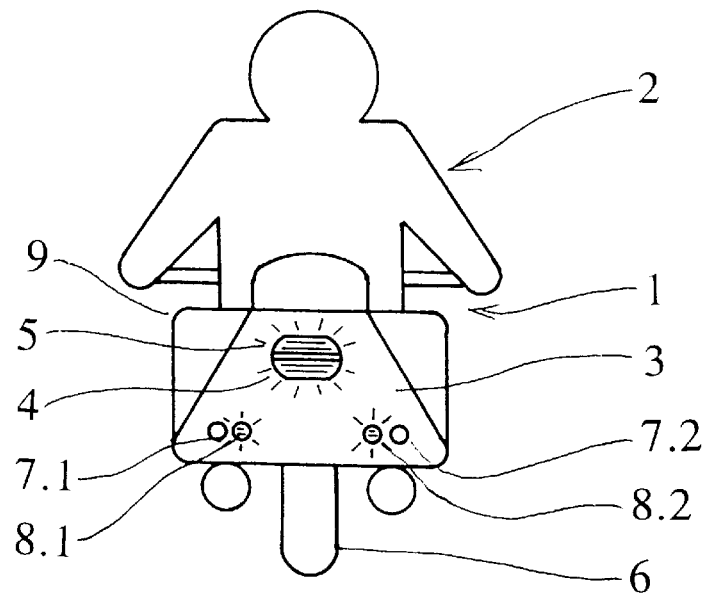

FIG. 4 shows schematic rear view of a motorcycle 1, which demonstrates lighting system consisting of lights 4, 5, 7.1, 7.2, 8.1 and 8.2 at rear side of the motorcycle 1 in accordance with this technical solution—in situation when rear direction lights 7.1 and 7.2 are not lit and brake light 5 together with additional brake lights 8.1 and 8.2 are lit. It is evident that optical information about braking of the motorcycle 1 is thus significantly enriched by another distinct signal for the driver of the vehicle following the motorcycle 1, since in this way overall luminous flux of brake lights 5, 8.1 and 8.2 is increased and namely there are simultaneously lit additional brake lights 8.1 and 8.2, which cannot be mistaken for clearance light 4, nor for rear direction lights 7.1 and 7.2 that have different character of lighting as well as different color, and they are moreover situated in different place of viewing field of the driver following the motorcycle 1, which considerably reduces risk of their being overlooked.

Additional brake lights 8.1 and 8.2 as such can use ordinary lamp or they can use as light source photo-emission elements that have higher rate of achievement of full light intensity.

I claim:

1. Lighting system at a rear part (3) of a motorcycle, at least one of a rear clearance light, a main brake light and a numberplate light contained in a vertical central plane of a rear wheel, and rear direction lights situated symmetrically to said central vertical plane wherein additional brake lights (8.1 and 8.2), which are electrically connected with said main brake light (5) are arranged symmetrically to said central vertical plane of the rear wheel (6) at the rear part (3) of the motorcycle (1).

2. Lighting system in accordance with the claim 1 wherein said additional brake lights (8.1 and 8.2) are arranged at said rear part (3) of the motorcycle (1) next to respective rear direction lights (7.1 and 7.2).

3. Lighting system in accordance with claim 2 wherein said additional brake lights (8.1 and 8.2) are arranged at said rear part (3) of the motorcycle (1) in vertices of an isosceles triangle with its main vertex at the main brake light (5).

4. Lighting system in accordance with claim 2 wherein said additional brake lights (8.1 and 8.2) are arranged at said rear part (3) of the motorcycle (1) on a trunk box (9).

5. Lighting system in accordance with claim 3 wherein said additional brake lights (8.1 and 8.2) are arranged at said rear part (3) of the motorcycle (1) on a trunk box (9).

6. Lighting system in accordance with claim 1 wherein said additional brake lights (8.1 and 8.2) are arranged at said rear part (3) of the motorcycle (1) in vertices of an isosceles triangle with its main vertex at the main brake light (5).

7. Lighting system in accordance with claim 3 wherein said additional brake lights (8.1 and 8.2) are arranged at said rear part (3) of the motorcycle (1) on a trunk box (9).

8. Lighting system in accordance with claim 1 wherein said additional brake lights (8.1 and 8.2) are arranged at said rear part (3) of the motorcycle (1) on a trunk box (9).

* * * * *